US007980143B2

(12) United States Patent
Peleg (10) Patent No.: US 7,980,143 B2
(45) Date of Patent: Jul. 19, 2011

(54) APPARATUS FOR TRANSFORMING ENERGY OF LIQUID FLOWING IN A LIQUID SUPPLY PIPELINE

(75) Inventor: Dani Peleg, Kiryat Tivon (IL)

(73) Assignee: Hydrospin Monitoring Solutions Ltd, Herzlia (IL)

(*) Notice: Subject to any disclaimer, the term of this patent is extended or adjusted under 35 U.S.C. 154(b) by 0 days.

(21) Appl. No.: 12/730,116

(22) Filed: Mar. 23, 2010

(65) Prior Publication Data

US 2010/0230969 A1  Sep. 16, 2010

Related U.S. Application Data

(63) Continuation-in-part of application No. 11/658,689, filed on Jan. 25, 2007, now Pat. No. 7,712,383, and a continuation of application No. PCT/IL2005/000774, filed on Jul. 21, 2005.

(30) Foreign Application Priority Data

Jul. 26, 2004  (IL) .......................... 163208

(51) Int. Cl.
*G01F 15/06* (2006.01)
(52) U.S. Cl. .................................. 73/861.78
(58) Field of Classification Search ... 73/861.77–861.79
See application file for complete search history.

(56) References Cited

U.S. PATENT DOCUMENTS

| | | | |
|---|---|---|---|
| 4,140,013 A | 2/1979 | Hunger | 73/861.77 |
| 5,027,653 A | 7/1991 | Foran, Jr. | 73/253 |
| 6,011,334 A | 1/2000 | Roland | 310/86 |
| 6,106,705 A * | 8/2000 | Giordano et al. | 210/87 |
| 6,526,907 B1 | 3/2003 | Donehue | 116/274 |
| 6,619,138 B2 | 9/2003 | Kettle, Jr. et al. | 73/861.52 |
| 6,848,503 B2 | 2/2005 | Schultz | 166/66.5 |
| 6,854,342 B2 * | 2/2005 | Payne et al. | 73/861.79 |
| 6,926,821 B2 * | 8/2005 | Giordano et al. | 210/87 |
| 7,111,520 B2 | 9/2006 | Payne | 73/861.79 |

OTHER PUBLICATIONS

Northwest PowerPipe, "Advanced Turbine Technology Generates Renewable Energy in Water Transmission Systems", Vancouver, Washington, Aug. 8, 2009.
Global Water Instrumentation, Inc., Adjustable Turbine Flow Sensor. http://www.globalw.com/products/TX100.html. Webpage printed on Jan. 31, 2009.
SeaMetrics., IP 115/215 Hot-tap Insertion Flow Sensor Specifications, Feb. 15, 2005.

* cited by examiner

*Primary Examiner* — Jewel Thompson
(74) *Attorney, Agent, or Firm* — Ladas & Parry, LLP (57) ABSTRACT

An apparatus for use with a liquid supply pipeline, for transforming energy of liquid passing therethrough into electrical energy, comprising: a housing configured to be received within the pipeline and having a liquid inlet and a liquid outlet defining a flow direction therebetween, at least one current generator including a rotor supported by the housing and having a shaft and a plurality of vanes attached thereto, the shaft extending in the housing along the flow direction allowing rotation of the vanes by liquid passing through the generator, and a stator associated with the rotor for producing electrical signals corresponding to the rotation of the rotor, and a power storage mean to which the at least one current generator is electrically connected, for receiving the electrical signals.

23 Claims, 6 Drawing Sheets

APPARATUS FOR TRANSFORMING ENERGY OF LIQUID FLOWING IN A LIQUID SUPPLY PIPELINE

CROSS-REFERENCE TO RELATED APPLICATIONS

This application is a continuation-in-part (CIP) of U.S. patent application Ser. No. 11/658,689, filed on Jan. 25, 2007, which is the U.S. National Stage of International Patent Application No. PCT/IL2005/000774, filed on Jul. 21, 2005, which claims priority to Israeli Patent Application No. 163, 208, filed on Jul. 26, 2004, the disclosure of each of these documents being hereby incorporated by reference in its entirety.

FIELD OF THE INVENTION

The presently disclosed subject matter relates to an apparatus for transforming energy of liquid flowing in a liquid supply pipeline into electrical energy. Specifically, the presently disclosed subject matter is concerned with electric power generators for pipelines based on turbine-driven generators to be energized by the flow of fluid.

BACKGROUND OF THE INVENTION

Electric power generators driven by liquid flowing under pressure in pipes are known, for example, from U.S. Pat. No. 6,011,334, U.S. Pat. No. 6,526,907 and U.S. Pat. No. 6,848, 503, disclosing rotational drive means disposed inside the pipes axially along the direction of flow.

SUMMARY OF THE INVENTION

According to one aspect of the presently disclosed subject matter, it refers to an apparatus for use with a liquid supply pipeline, for transforming energy of liquid passing therethrough into electrical energy, the apparatus comprising:

a housing configured to be received within the pipeline and having a liquid inlet and a liquid outlet defining a flow direction therebetween, at least one current generator including a rotor supported by the housing and having a shaft and a plurality of vanes attached thereto, the shaft extending in the housing along the flow direction allowing rotation of the vanes by liquid passing through the generator, and a stator associated with the rotor for producing electrical signals corresponding to the rotation of the rotor, and a power storage mean to which the at least one current generator is electrically connected, for receiving the electrical signals.

It should be understood that the liquid inlet and liquid outlet can be interchangeable.

The current generator can comprise magnets attached to free ends of at least some of the vanes and at least one electrical winding disposed on, or adjacent to, the housing.

The association between the rotor and the stator can be effected by magnetic transmission. For example, the stator can be in the form of a coil and the vanes can be at least partly surrounded by magnetic elements rotating in close relation to windings of the coil. In another example, the vanes can be at least partly made of magnetic material and can be rotatable in close relation to windings of the coil. The coil can be located inside and/or outside the housing.

The current generator can comprise an upstream housing part and a downstream housing part in the form of separate components spaced by the rotor and supporting the shaft at two ends thereof with the shaft being freely rotatable with respect to the upstream and downstream housing parts. For example, the housing parts can be in the form of apertured covers. The upstream and downstream housing parts can be made of materials having different magnetic properties. For example, at least the downstream part can be configured as a strainer constantly or intermittently magnetized in order to block ferromagnetic particles in the flow of liquid.

The housing can be insertable through a sealable connection into the liquid supply pipeline. For example, the housing can be affixable to, and detachable from, the pipeline.

The apparatus can comprise a plurality of the current generators arranged in parallel within the housing. For example, the current generators can be arranged in a direction transverse to the flow direction.

The apparatus can further be configured for measuring the amount of liquid passing through the current generator, and further comprise: a controller for receiving the electrical signals for processing and producing output signals indicative of the amount of liquid, and wherein the power storage mean includes a power storage and supply unit configured to charge the apparatus and to supply power to the controller required for its operation. For example, the power storage and supply unit can be rechargeable and/or the power storage mean can be configured to provide power to the apparatus during cessation or low flow of liquid. The apparatus can further include an integrator for calculating the volume of liquid passing through the housing and/or an electrically actuated gating device disposed at, or adjacent to, the inlet or outlet of the current generator for selectively blocking liquid flow therethrough.

According to another aspect of the presently disclosed subject matter, there is provided an apparatus comprised of: a housing to be serially installed in a pipeline in a way allowing the liquid to pass through the housing; a turbine installed inside the housing so as to be rotatable by the passing liquid; a generator pivotally or geared joined to the turbine to generate electrical power according to the turbine's rotation; and a controller configured to measure the liquid flow in a way of integrating the supplied electrical power in a time sequence.

According to an embodiment of the presently disclosed subject matter, it is provided the apparatus, wherein the generator is geared by two cogwheels, first cogwheels on the generator axis and second cogwheel on the turbine axis.

According to another embodiment of the presently disclosed subject matter, it is provided the apparatus, further including a valve installed in the housing, wherein the controller, according to predetermined criteria, operates the valve.

According to another embodiment of the presently disclosed subject matter, it is provided the apparatus, wherein the controller is programmable and operative, according to predetermined criteria, to perform tasks including opening and closing valves, transmitting measured information and controlling other means.

According to another embodiment of the presently disclosed subject matter, it is provided the apparatus, wherein the controller further includes a transceiver, this transceiver enables the controller to transmit and receive information, enables the controller to command other controllers or to be commanded by other controllers and enables remote programming of this controller.

According to another embodiment of the presently disclosed subject matter, it is provided the apparatus, further including an electrical power storage, wherein the generator can charge the electrical power storage. This power storage can be a chargeable battery, a capacitor or both.

According to another embodiment of the presently disclosed subject matter, it is provided the apparatus, wherein the generator is integrated with the turbine in a way that the rotor of the generator is built in the turbine's blade and the stator of the generator is built in the housing.

According to another embodiment of the presently disclosed subject matter, it is provided the apparatus, wherein the generator is integrated with the turbine in a way that the rotor of the generator is built on the turbine's blade and the stator of the generator is built in the turbine's axis.

According to another embodiment of the presently disclosed subject matter, it is provided the apparatus, further including a wall, made of a non magnetic material, separating between the turbine and the generator, wherein the drive coupling between the turbine and the generator is done by first and second magnets, wherein the first magnet is installed on the turbine axis near the wall and the first magnet drives the second magnet that is located on the other side of the wall—against the first magnet—and the second magnet is installed on the generator axis.

According to another embodiment of the presently disclosed subject matter, it is provided the apparatus, wherein the housing is separated into a first and second liquid passage and having a large turbine for high flow liquid and small turbine for low flow liquid—both are connected to generators—wherein the large turbine is located in the first passage and the small turbine is located in the second passage and wherein the first passage has a valve that enables or disables liquid to pass through the passage according to a predetermined criteria and wherein the criteria can be, inter alia, pressure differences or a command from the controller. By another preferred embodiment of the presently disclosed subject matter it is provided the liquid supply measuring apparatus, wherein the valve is closed in a low flow of liquid through the apparatus, and is opened when the flow is rising over a predetermined threshold.

According to further aspect of the presently disclosed subject matter, there is provided an apparatus for use in a liquid, or any other flowing material, comprising: a housing to be serially installed to a liquid pipe in a way that the supplying liquid passes through the housing; a turbine, the turbine is installed inside the housing, wherein the turbine is spin by the passing liquid; a multi polar magnet that is attached to the turbine, creating a rotate able assembly; a claw pole stator with a coil, wherein the assembly is rotating inward inducing a full wave AC electrical power in the coil; a diode bridge that rectified the AC electrical power into DC electrical power; a power storage means, capable to store the DC electrical power; and a controller, capable to calculate the supplied liquid in a way of integrating the DC or AC electrical power in a time sequence.

According to another aspect of the presently disclosed subject matter, there is provided a method comprising: passing the liquid through a turbine, rotating a generator by the turbine, and integrating the power that is supplied by the generator during a time sequence.

According to still another aspect of the presently disclosed subject matter, there is provided an apparatus sealingly built into a tubular body having a longitudinal axis, and comprising at least one turbine-driven generator having a rotor rotatable about an axis transverse to the longitudinal axis of the said tubular body, and a stator configured to generate electrical signals in accordance the rotation of the rotor, said tubular body being insertable into a fluid flow pipeline through the pipeline's wall via a sealable connection so that its longitudinal axis is transverse to the fluid flow direction and so that only a part of the fluid flow in the pipeline, passes through said turbine-driven generator. The apparatus can be used either solely for generating electrical energy or for measuring the fluid flow, and optionally controlling it and communicating control data to the exterior of the pipeline.

According to a still further aspect of the subject matter of the present application, there is provided a combination of a pipeline configured to allow fluid flow therethrough, with the apparatus according to one or more aspects described above.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Throughout the specification the terms current generator and turbine-driven generator can be used interchangeably while having the same meaning. Also, throughout the specification the terms vanes and blades can be used interchangeably.

Figure 1:
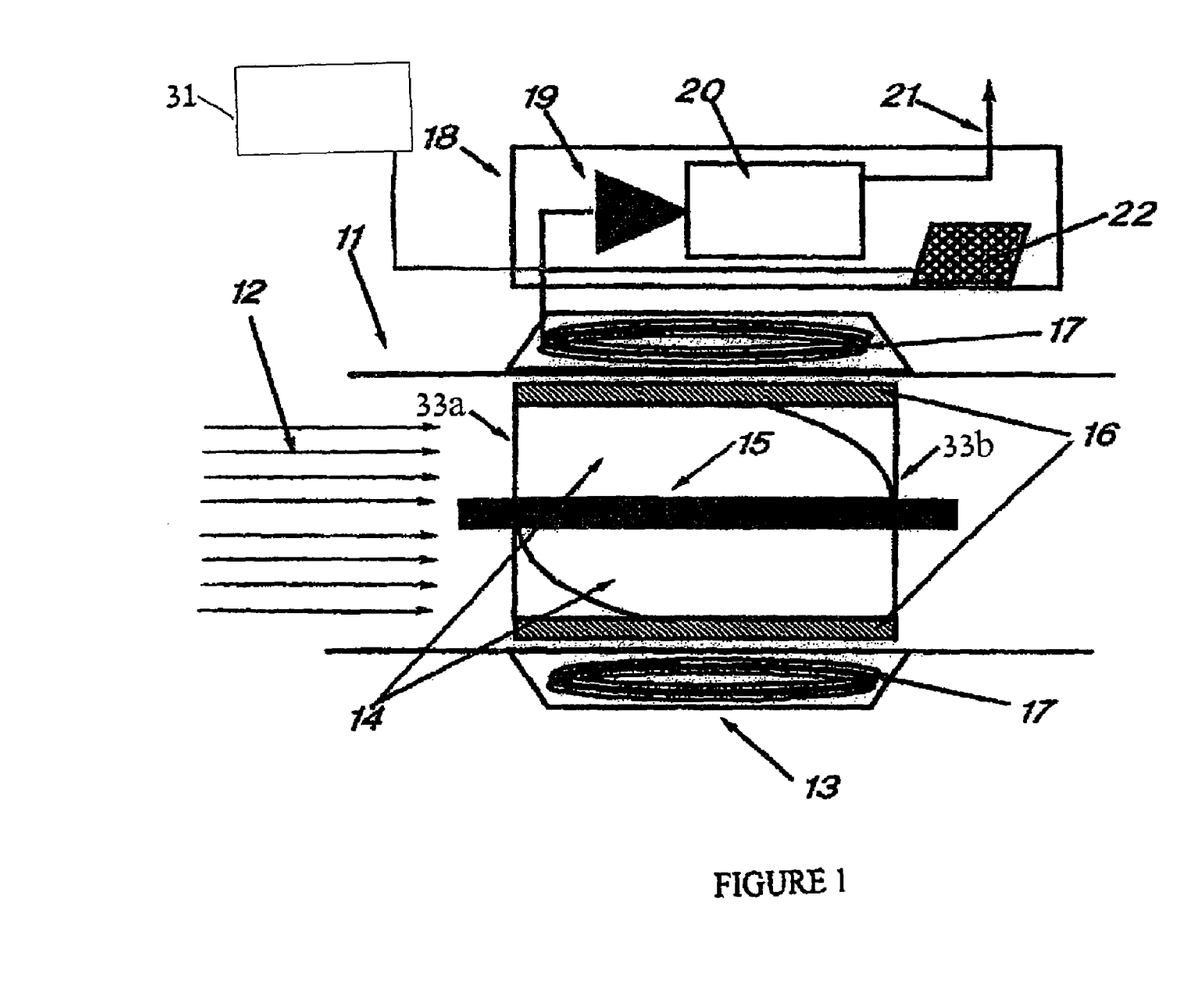
FIG. 1 is a schematic view of an apparatus according to one embodiment of the presently disclosed subject matter.

FIG. 1 illustrates a block diagram and a cross section of an embodiment of an apparatus according to the presently disclosed subject matter. Generally, the apparatus includes a housing 11 configured to be received within a pipeline (not shown in FIG. 1) and having a liquid inlet 33a and a liquid outlet 33b defining a flow direction therebetween. The apparatus further includes a current generator in the form of a turbine including a rotor supported by the housing 11 and having a shaft 15 and a plurality of vanes 14 attached thereto. The shaft 15 extends in the housing along the flow direction allowing, rotation of the vanes 14 by liquid passing through the generator, and a stator 13 associated with the rotor for producing electrical signals corresponding to the rotation of the rotor. The apparatus further includes a power storage mean 22 to which the current generator is electrically connected, for receiving electrical signals.

Liquid inlet 33a and liquid outlet 33b can be interchangeable, with the apparatus of the presently disclosed subject matter being configured for transforming energy of liquid that can flow in either of the two directions in a pipe at different times.

More particularly, through the housing 11 a liquid 12 is passing and spins the turbine, which is comprised of the rotor having the rotor vanes 14 and magnets 16 that are installed on the edges of each vane and rotatable on the shaft 15. The stator 13 is built on the housing 11 having coils 17 where the electrical power is created according to the spin of the vanes 14 with the magnets 16, i.e., rotor.

As an addition to this embodiment, some of the electrical power can be transferred to a controller 18, wherein any parameter of the created electrical power, i.e., voltage, current or frequency, can be used to calculate the liquid quantity that passes during a time sequence. Controller 18 includes an integrator 19 to calculate the passed liquid, a control unit 20 capable to store information and use it for controlling valves or controlling other systems via a communication channel 21. The controller 18 is operated by the power storage mean 22. This power storage mean 22 e.g., chargeable battery or capacitor, is charged by the power that is created by the apparatus itself.

Figure 2:
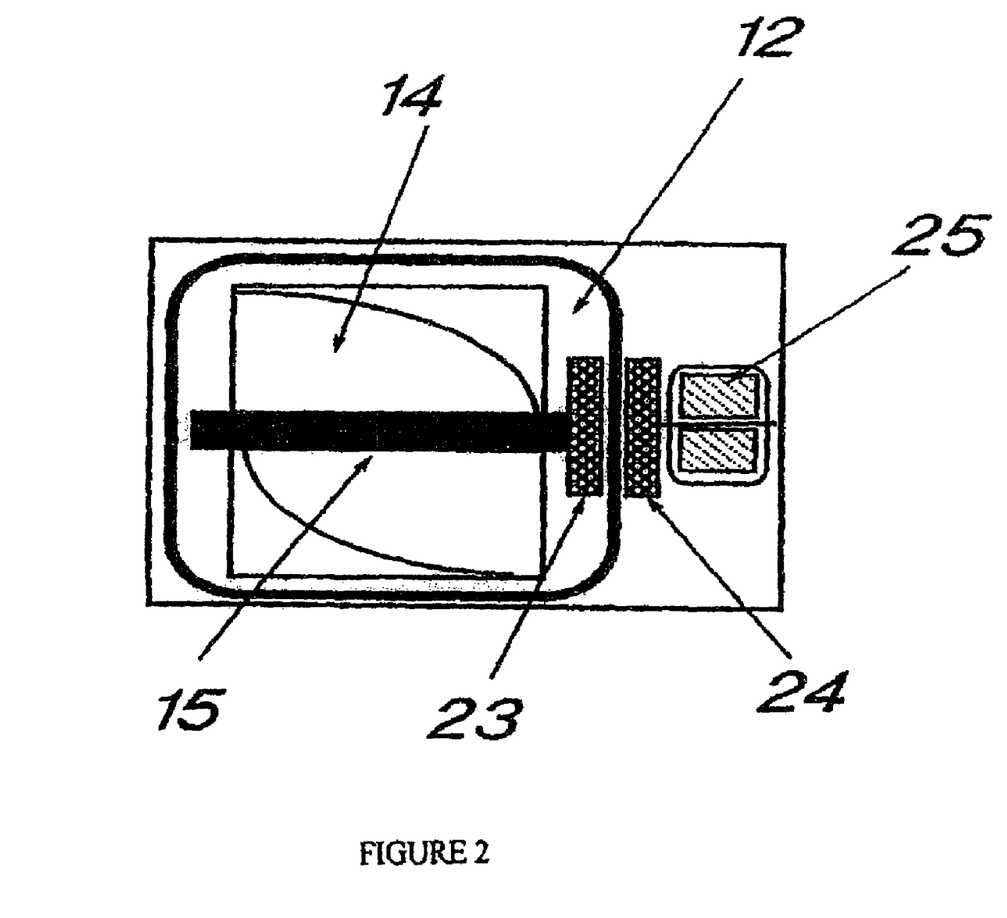
FIG. 2 is a schematic view of a magnetic generator drive that can be used in the apparatus shown in FIG. 1.

FIG. 2 illustrates an embodiment with a magnetic drive current generator. The liquid 12 is passing and rotating the turbine with rotor vanes 14 and shaft 15. A first magnet 23 is installed on the shaft 15 and rotates with it. The first magnet 23 drives the second magnet 24 that is located over the housing wall and the second magnet 24 rotates the generator 25.

Figure 3:
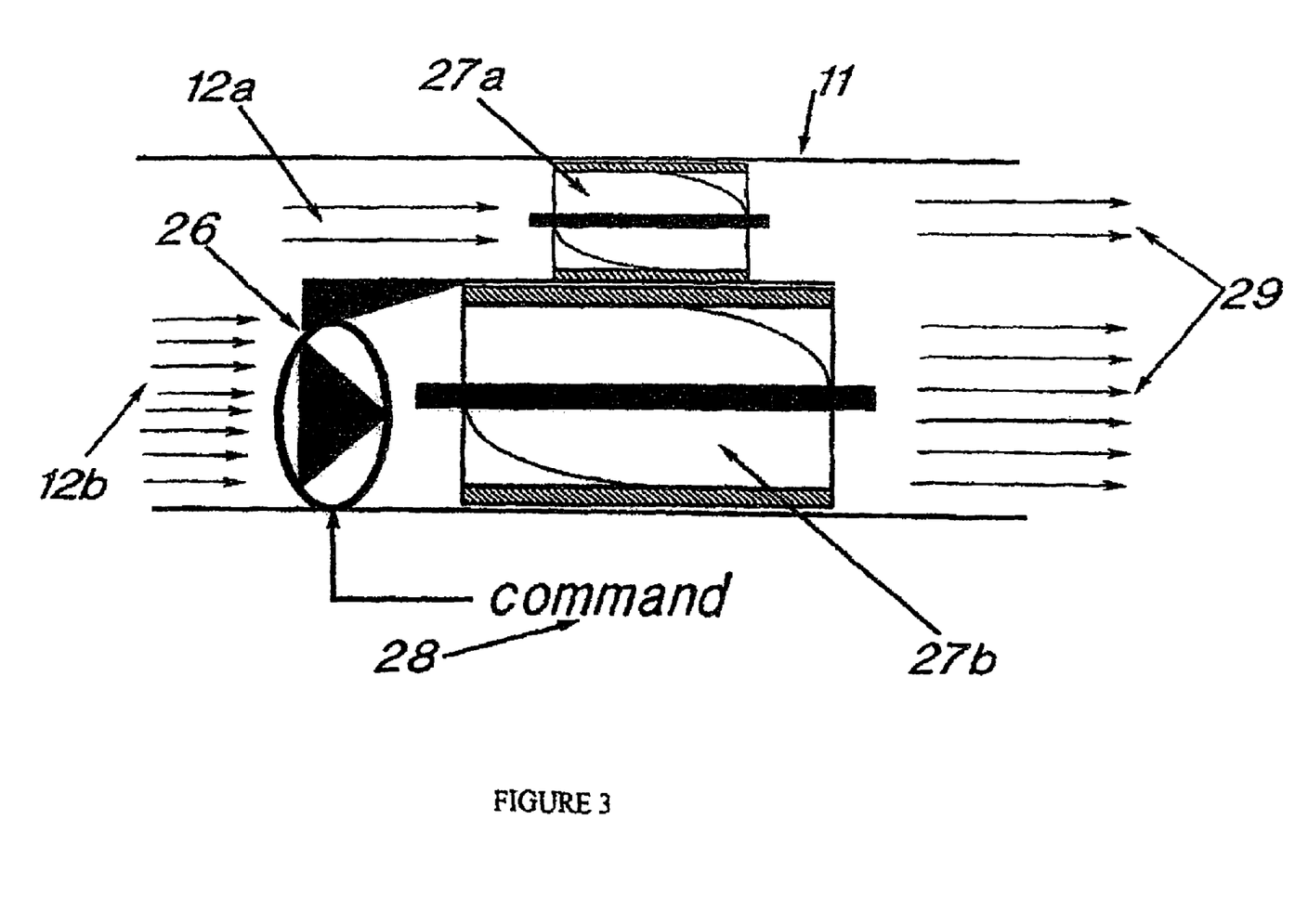
FIG. 3 is a schematic view of an apparatus according to another embodiment of the presently disclosed subject matter.

FIG. 3 illustrates a cross section of an embodiment with two passages: one for low flow and the other is opened in a high flow. This configuration is needed to better extract energy and perform more accurate measurements in cases of significant flow changes. To accurate the flow measurement, a small turbine 27a is needed for the low flow and a large turbine 27b is needed for the high flow. In such a configuration the liquid 12a & 12b enters the housing 11. As long the pressure is low, which means slow flow, the valve 26 is closed and liquid 12a slowly flows through the small turbine 27a. When the pressure is increased over a predetermined threshold a command 28 from the controller (not shown) opens the valve 26 enabling liquid 12b to pass through the large turbine 27b. In case of reducing flow the command 28 will close the valve 26. The controller (not shown) calculates from both turbines the supplied liquid 29.

The apparatus according to any of the embodiments shown above, can be used to direct some or all of the electric power generated thereby to a power storage mean different from the power storage mean 22, for example to an external power storage mean 31. This external power storage mean 31 can be used for any purpose, e.g., to charge accumulators, power water supply sensors or pumps, to be introduced into the public power grid or any other electrical infrastructure, etc.

Figure 4:
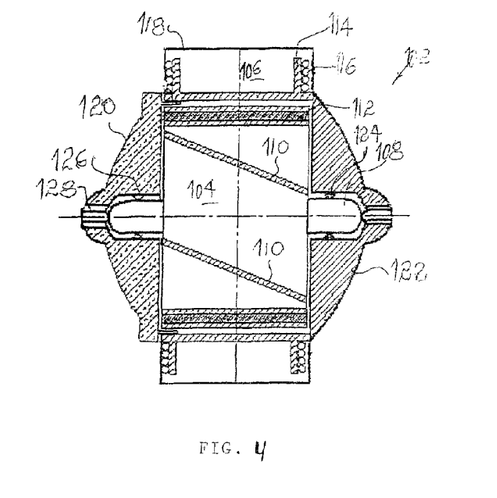
FIG. 4 is a cross-sectional view of a turbine-driven generator that can be used in an apparatus, according to a further embodiment of the presently disclosed subject matter, taken along a plane comprising axis of rotation of the generator's rotor and longitudinal axis of the apparatus.

FIG. 4 illustrates a turbine-driven generator 102 that can be used in an apparatus mountable within a liquid supply pipeline for transforming energy of liquid passing therethrough into electrical energy.

The turbine-driven generator 102 includes a rotor 104 and a stator 106. The rotor 104 has a shaft 108, a plurality of blades 110 and a ring or several magnetic elements 112 affixed to the periphery of the rotor 104. Alternatively, the blades 110 themselves may be at least partially made of magnetic material. The stator 106 includes a body 114 supporting windings of a coil 116, a shield 118 housing the coil 116, an upstream housing part in the form of a strainer 120, e.g., a mechanical, electronic or electromagnetic strainer facing the direction of fluid flow, and a downstream housing part in form of an apertured fluid output surface 122, which can have different or similar magnetic properties as those of strainer 120. The strainer 120 and surface 122 thus constitute covers for the rotor 114. The electromagnetic strainer 120 may be constantly or intermittently magnetized. The shaft 108 is rotationally seated in low friction bearings 124, 126, advantageously formed in the strainer 120 and surface 122, which bearings are configured to be rinsed by the flowing fluid through passage 128.

Figure 5:
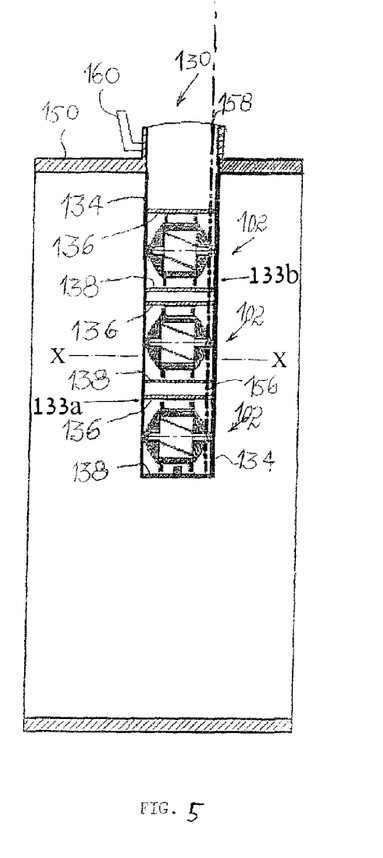
FIG. 5 is cross-sectional view, drawn to a smaller scale, of an apparatus using turbine-driven generators as shown in FIG. 4, in a plurality of turbine-driven generator units, disposed in a fluid flow pipeline, according to an embodiment of the presently disclosed subject matter, the cross-sectional view being taken along a plane passing through the longitudinal axis of the apparatus and axes of rotation of rotors of the generators.
Figure 6:
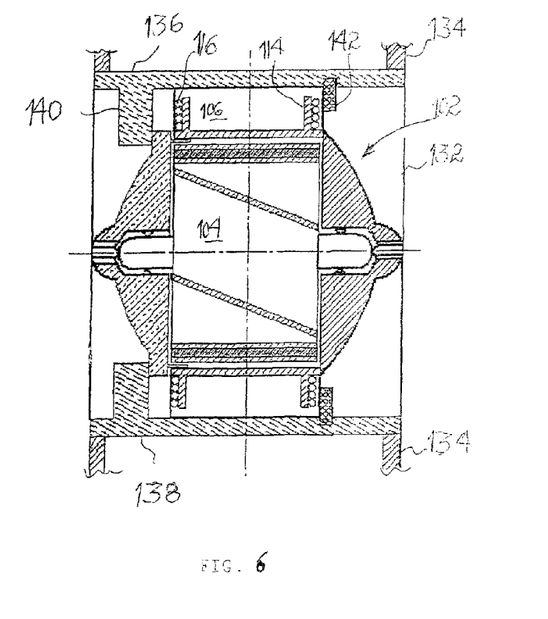
FIG. 6 is a cross-sectional view of one turbine generator unit of the apparatus shown in FIG. 5.

FIGS. 5 and 6 illustrate an apparatus 130 including a bank of three turbine-driven generators 102 affixed, in parallel to each other, in passages 132 traversing the lower part of a tubular body, e.g., a test-tube-like cylindrical housing 134, which passages 132 are separate from each other inside the cylindrical housing 134 by traverse partitions 136, 138. In combination, opposing sides of the passages 132 define a liquid inlet 133a, a liquid outlet 133b and a fluid direction axis X therebetween.

The apparatus 130 is a sealed apparatus, which can be inserted traversely into an opening 158 made in the fluid pipe 150 and removably affixed therein by means of an adapter 160. The turbine-driven generators 102 thus become arranged in a direction transverse to the flow direction of liquid in the pipe 150. The adapter 160 may include a handle, or the like, for affixing and releasing the sealed apparatus 130 from the pipe for any easy replacement and/or maintenance. Obviously, such a sealed apparatus 130 may be otherwise removably inserted in the pipe 150, e.g., by screwing it into a threaded adapter 160. Electrical wires 156 are used to conduct electricity from the turbine generators, for example, to an external power storage mean 181. The apparatus 130 can also be adapted for insertion into a pipeline with pressurized liquid flow, for example, by designing the adapter to further include a valve(s) that allows insertion and removal of the apparatus from the pipe with minimum leakage therefrom. Multiple different techniques for pressurized and non-pressurized insertion of different devices in a pipe, i.e. hot tapping, are known in the art and are equally applicable to the presently disclosed subject matter.

As can be seen in FIG. 6, the generators 102 are affixed inside the cylindrical housing 134, at one lateral side, against a ring 140, and advantageously, on the other side, by a spring-loaded catch 142. The catch 142 can be embodied in different ways, all per se known, to facilitate insertion and dislodging of a generator 102 for periodic cleaning or replacement.

It should be understood that the number of turbine-driven generators 102 included in each sealed apparatus 130 inserted in a pipe 150, their geometry and dimensions, as well as the dimension of the apparatus itself, is a matter of choice, inter alia, depending on the diameter of the pipe to which it is connected, the fluid flow duration and speed, the wanted or required power output, etc.

For example, in the apparatus 130 the cylindrical housing 134 can have the following parameters:

a diameter d of the housing corresponding to the distance between the inlet and outlet of each of its current generators 102 (this diameter defines that of the opening 158);

the length L of the housing which is essentially greater than its diameter d, e.g. which is not less than 2 d, in particular, not less than 3 d, where the length L can be not less than 0.3 of the diameter of the pipe 150, in particular not less than 0.5 of the diameter of the pipe, or it can be in the range of 0.25 to 0.75, more particularly between 0.4 to 0.6 of the diameter of the pipe.

If the housing 134 is designed to be non-cylindrical, than the dimension d above will refer to a circle inscribed in the cross-section of the housing taken along a plane passing though its axis X.

Figure 7:
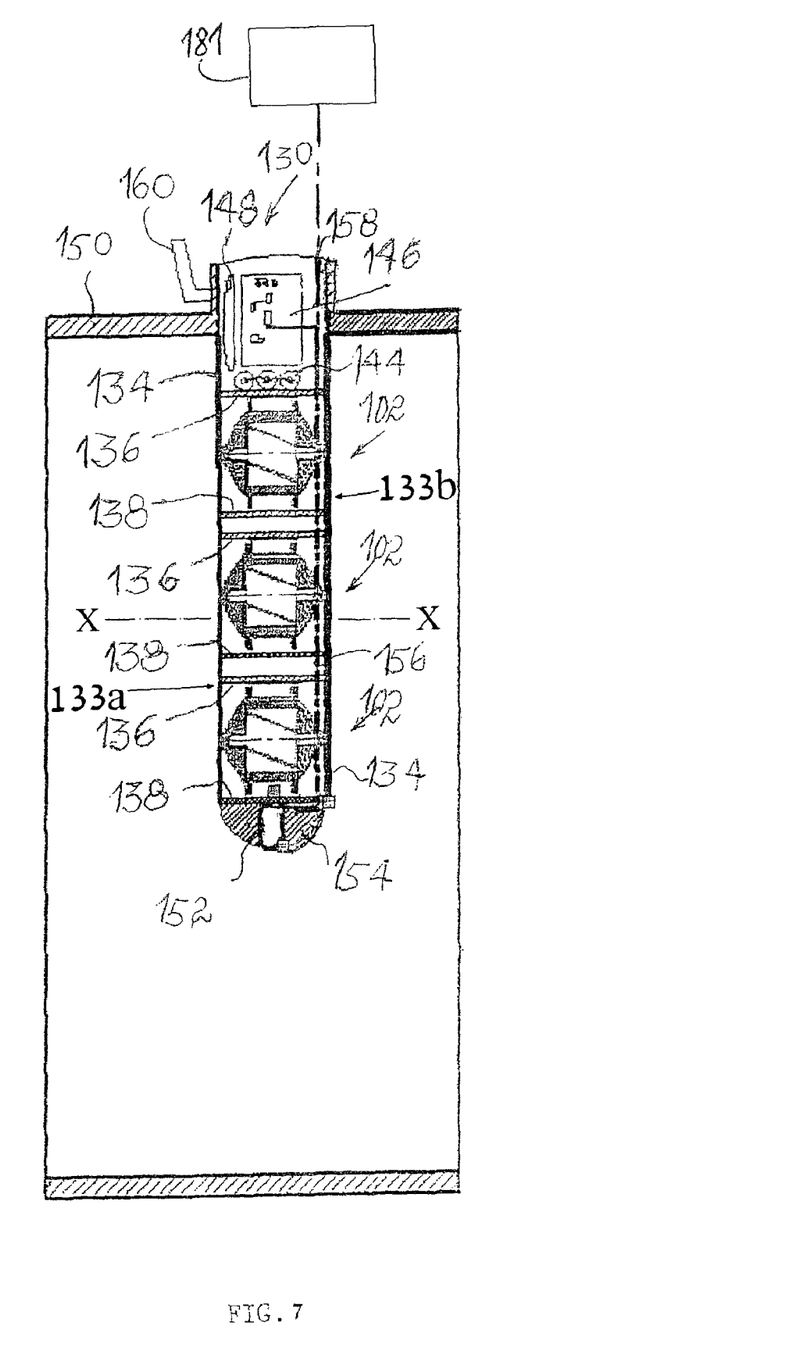
FIG. 7 is a cross-sectional view of a self-powered, remote, water-monitoring apparatus, according to an embodiment of the presently disclosed subject matter.

FIG. 7 illustrates the apparatus 130 further adapted to serve as a self-powered, remote, water-monitoring unit. In this case, at the upper part of the cylinder 134, there is housed at least one accumulator 144, per-se known, measuring, controlling and communicating circuits 146, e.g., a PCB, and an antenna 148 for receiving and transmitting data from the circuits 146. The circuits 146 are powered by the accumulator 144, which is recharged by the turbine-driven generators 102 when fluid flows in a section of the pipe 150, in which the apparatus 130 is installed. At the lower end of the cylinder 134, there is affixed a probe 152 for sensing the fluid flow in the section of the pipe 150, and optionally, a cathode 154 for treating the surrounding fluid. The cylinder 134, supporting and housing one or more turbine-driven generators 102, coils 116, accumulator 144, circuits 146, antenna 148, probe 152 and cathode 154, are all electrically connected by wires 156. For clarity purposes, the electrical wiring or electrical connections between the accumulator 144 and the circuits 146, are not shown in FIG. 7, however, reference in this aspect is made to FIG. 8.

Figure 8:
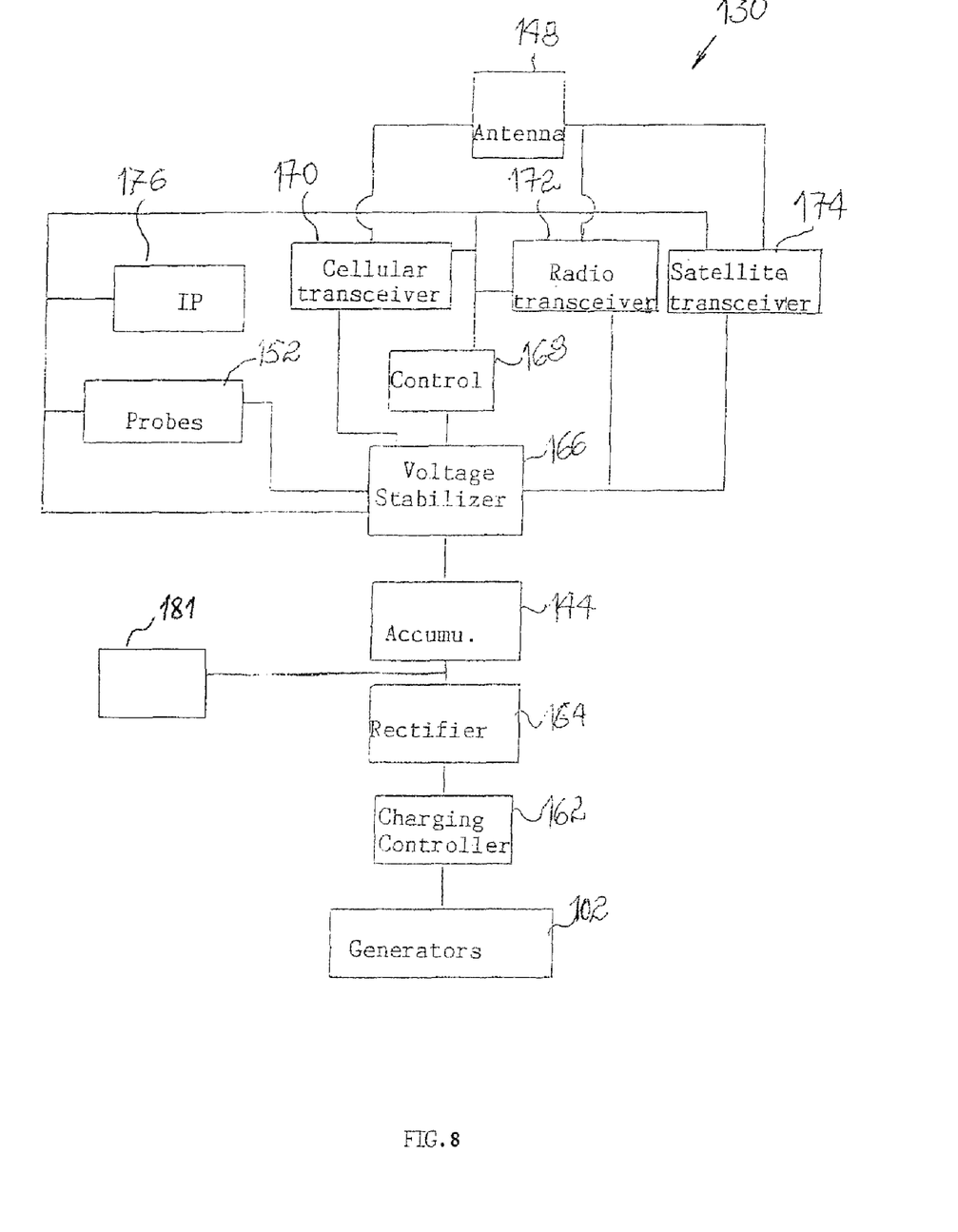
FIG. 8 is a block diagram of a self-powered, remote, water-monitoring apparatus, according to an embodiment of the presently disclosed subject matter.

With reference to FIG. 8, the generator or bank of generators 102, are electrically connected to the accumulator 144 and/or can be connected, for example, to external power mean 181, via a charging controller 162 and a rectifier 164. The output from the accumulator 144 leads through a voltage stabilizer 166 to the apparatus's controller 168 operating a remote water-monitoring system via any one of the communication means, including a cellular transceiver 170, a radio transceiver 172 or a satellite transceiver 174. The latter requires an IP unit 176. The antenna 148 is operationally connected to three transceivers 170, 172 and 174.

A plurality of apparatuses according to the presently disclosed subject matter can be received within a pipeline in the manner shown in FIG. 5 or any other suitable manner, which would result in greater energy production, more accurate liquid flow measurement, etc. Wherein the apparatuses further comprise communication means, a system of apparatuses can be linked by a wired or a short range wireless connection that enables communication between them and at least one of the apparatuses which has a long range wireless communication means for communicating information regarding the entire system of apparatuses to a distant monitoring station.

The apparatus is adaptable for use with a liquid of any type, e.g., water, salt-water, sewage, oil, fuel and etc. Standard corresponding adaptations of the components of the apparatus, such as protective surface coatings, blade geometry and the like are thus assumed to be within the scope of the presently disclosed subject matter.

Multiple types of sensors and means for interaction with the liquid flow can be mounted on or inside the housing of the apparatus and can be used for sensing fluid flow and/or interacting therewith, as would be appreciated by those skilled in the art. For example, a small turbine for measuring fluid flow therethrough, pressure sensors, magnetic flow meters, sensors that measure: conductivity, pH, turbidity, chlorine content, dissolved oxygen content and etc, other sensors that can discern the chemical composition of a liquid, means for affecting the chemical composition of a liquid, means for affecting the hydrodynamics of a liquid in the pipe, filters, etc. Electrochemical liquid treatment equipment can be added, for example, in the form of a cathode for treating the liquid and preventing corrosion of the pipeline.

Those skilled in the art to which this invention pertains will readily appreciate that numerous changes, variations, and modifications can be made without departing from the scope of the invention, mutatis mutandis.

The invention claimed is:

1. An apparatus for use with a liquid supply pipeline, for transforming energy of liquid passing therethrough into electrical energy, comprising:
   a housing configured to be received within said pipeline and having a liquid inlet and a liquid outlet defining a flow direction therebetween;
   at least one current generator including a rotor supported by said housing and having a shaft and a plurality of vanes attached thereto, said shaft extending in the housing along said direction allowing rotation of said vanes by liquid passing through the generator, and a stator associated with said rotor for producing electrical signals corresponding to the rotation of said rotor; and
   a power storage mean to which the at least one current generator is electrically connected, for receiving said electrical signals; and
   wherein the current generator comprises an upstream housing part and a downstream housing part in the form of separate components spaced by the rotor and supporting the shaft at two ends thereof with the shaft being freely rotatable with respect to the upstream and downstream housing parts.

2. The apparatus as defined in claim 1, wherein the current generator comprises magnets attached to free ends of at least some of the vanes and at least one electrical winding disposed on, or adjacent to, the housing.

3. The apparatus as defined in claim 1, wherein the association between the rotor and the stator is effected by magnetic transmission.

4. The apparatus as defined in claim 3, wherein the stator is in the form of a coil and the vanes are at least partly surrounded by magnetic elements rotating in close relation to windings of the coil.

5. The apparatus as defined in claim 3, wherein the vanes are at least partly made of magnetic material and are rotatable in close relation to windings of the coil.

6. The apparatus as defined in claim 4, wherein the coil is located within the housing.

7. The apparatus as defined in claim 5, wherein the coil is located within the housing.

8. The apparatus as defined in claim 4, wherein the coil is located outside the housing.

9. The apparatus as defined in claim 5, wherein the coil is located outside the housing.

10. The apparatus as defined in claim 1, wherein the housing parts are apertured covers.

11. The apparatus as defined in claim 10, wherein the upstream and downstream housing parts are made of materials having different magnetic properties.

12. The apparatus as defined in claim 1, wherein at least the downstream part is configured as a strainer constantly or intermittently magnetized in order to block ferromagnetic particles in the flow of liquid.

13. The apparatus as defined in claim 1, wherein the housing is insertable through a sealable connection into the liquid supply pipeline.

14. The apparatus as defined in claim 13, wherein the housing is affixable to, and detachable from, the pipeline.

15. An apparatus for use with a liquid supply pipeline, for transforming energy of liquid passing therethrough into electrical energy, comprising:
- a housing configured to be received within said pipeline and having a liquid inlet and a liquid outlet defining a flow direction therebetween;
- at least one current generator including a rotor supported by said housing and having a shaft and a plurality of vanes attached thereto, said shaft extending in the housing along said direction allowing rotation of said vanes by liquid passing through the generator, and a stator associated with said rotor for producing electrical signals corresponding to the rotation of said rotor;
- a power storage mean to which the at least one current generator is electrically connected, for receiving said electrical signals; and
- wherein the apparatus comprises a plurality of the current generators arranged in parallel within the housing.

16. The apparatus as defined in claim 15, wherein the current generators are arranged in a direction transverse to the flow direction.

17. The apparatus as defined in claim 1, configured for measuring the amount of liquid passing through the current generator, and further comprising:
- a controller for receiving the electrical signals for processing and producing output signals indicative of said amount of liquid; and
- wherein the power storage mean includes a power storage and supply unit configured to charge the apparatus and to supply power to said controller required for its operation.

18. The apparatus as defined in claim 17, wherein the power storage and supply unit is rechargeable.

19. The apparatus as defined in claim 15, further comprising an integrator for calculating the volume of liquid passing through the housing.

20. The apparatus as defined in claim 15, further comprising a valve disposed at the housing for selectively blocking liquid flow therethrough.

21. The apparatus as defined in claim 15, wherein the power storage mean is configured to provide power to said apparatus during cessation or low flow of liquid.

22. A combination of a pipeline configured to allow fluid flow therethrough, with the apparatus according to claim 1, mounted therein.

23. The apparatus of claim 1, wherein the liquid inlet and liquid outlet are interchangeable.

* * * * *